July 23, 1929.   R. I. HENDERSON   1,721,881
FISHING TOOL
Filed Nov. 17, 1928
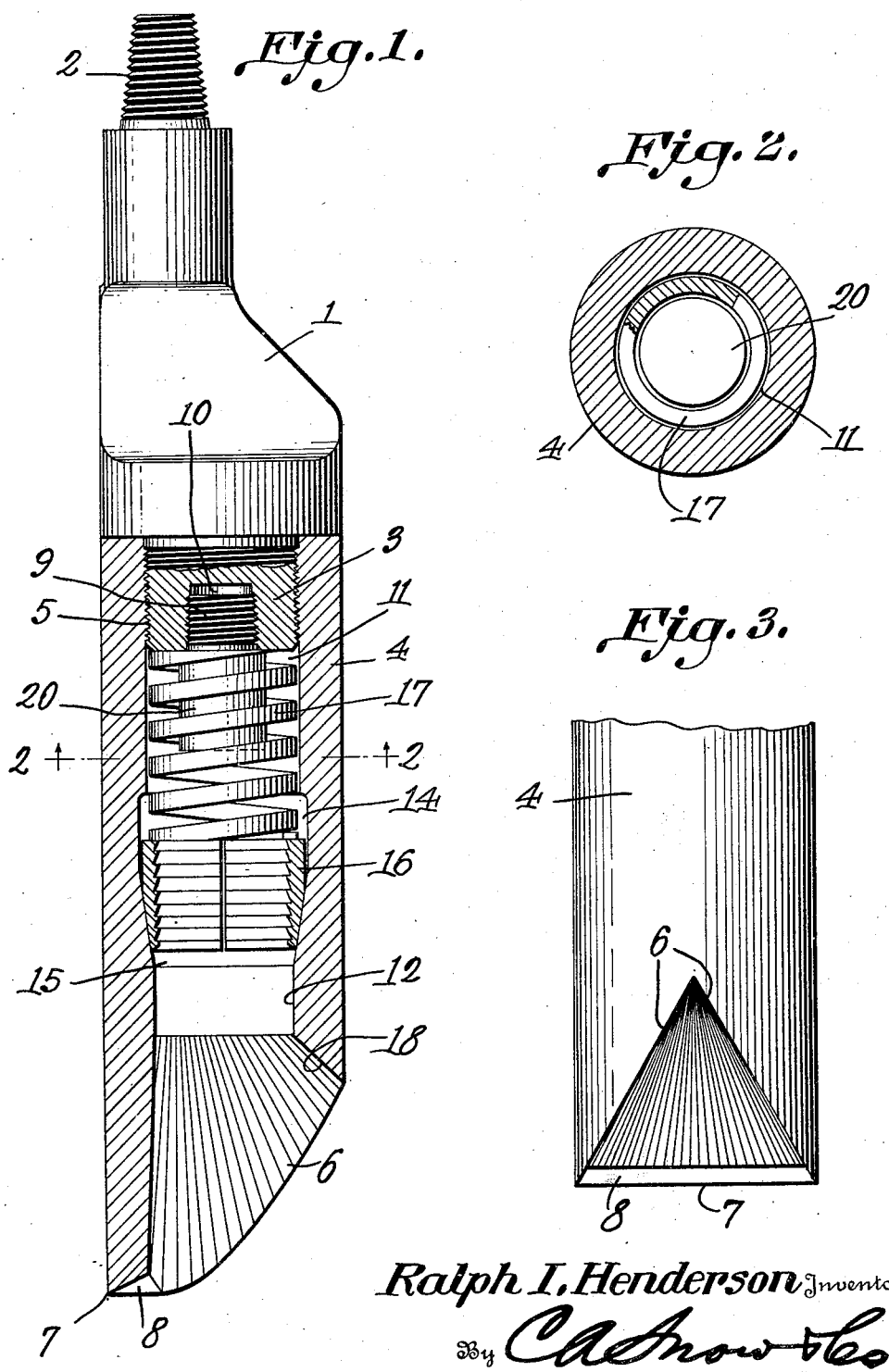
Ralph I. Henderson, Inventor
By C. A. Snow & Co.
Attorneys.

Patented July 23, 1929.

1,721,881

UNITED STATES PATENT OFFICE.

RALPH IRWIN HENDERSON, OF CHARLESTON. WEST VIRGINIA.

FISHING TOOL.

Application filed November 17, 1928. Serial No. 320,116.

This invention is a device for fishing lost well-tools out of a well. The structure is of a known type, comprising a head and a body assembled with the head, the body being bevelled off at its lower end, and the head being provided with a connector which is off-set laterally with respect to the axis of the head. The reason for constructing a fishing device in the way indicated above, is well understood by those skilled in the art, and a detailed discussion of the advantages of such a fishing device, or an explanation of its operation, need not be entered into at this place.

A fishing device of the sort above alluded to is shown in United States Patent No. 1,590,510. The disadvantage incident to the use of a fishing device constructed as shown in the patent specified arises out of the fact that the body of the fishing device is open at one side. It frequently happens that after the lost well-tools have been gripped and raised somewhat, the tools will stick in the well. It then becomes necessary to bump the fishing device up and down, and since the fishing device is open at the side, the lost well-tool often will bend laterally through the open side of the fishing device to such an extent that the tool will become caught in the well, a removal of the tool being absolutely impossible, and the well being ruined.

The foregoing being understood, the present invention aims to provide a fishing device which is so constructed that it will be impossible for the lost well-tool to be bent out through the side of the fishing device, an anvil being provided to receive the shock imparted to the upper end of the lost tool when the fishing device is moved up and down with respect to the tool, for the purpose hereinbefore mentioned.

It is within the province of the disclosure to improve generally and to enhance the utility of devices of that type to which the invention appertains.

With the above and other objects in view, which will appear as the description procedes, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in longitudinal section, a fishing device constructed in accordance with the invention, parts being in elevation;

Figure 2 is a transverse section taken on the line 2—2 of Figure 1;

Figure 3 is a fragmental elevation, wherein the fishing device is viewed at right angles to the showing of Figure 1.

In carrying out the invention, there is provided a head 1, equipped at its upper end with a connector 2 which is laterally off-set with respect to the axis of the head. The head 1 has a reduced lower end 3.

A body 4 is provided, and the end 3 of the head 1 is threaded at 5 into the upper end of the body 4, the body 4 is of cylindrical outline, and is imperforate, meaning by "imperforate" that the body 4 has no openings in its side wall.

The lower end of the body 4 is cut off at an incline, as shown at 6, to define a circumferential end edge 7, of appreciable length, said edge being inwardly and upwardly bevelled, as shown at 8. The operation of a fishing device including the laterally off-set connector 2 and the incline edge 6, is well understood by those skilled in the art, but as one specific improvement, it is to be observed, that there is no sharp pronounced point in the lower end of the body 4, there being, at that place, the circumferential edge 7 which is inwardly bevelled, as shown at 8. The strength of the fishing device, at its lower end, is increased accordingly, and the construction is such that the fishing device will more readily pick up a lost well-tool than would be the case if the edge 7 were not provided, and if that edge were not inwardly and upwardly bevelled, as shown at 8.

The numeral 20 marks an anvil having a reduced shank 9 which is threaded into a recess 10 formed in the lower extremity of the part 3 of the head 1. The body 4 has an upper cylindrical bore 11, and a lower cylindrical bore 12, the bore 11 being enlarged at its lower end, as shown at 14, the enlarged part 14 of the bore 11 communicating with a conical surface 15 which, in its turn, leads to the lower cylindrical bore 12. At the lower end of the body 4 there is a flared mouth 18 which leads upwardly to the bore 12.

Slips 16 are mounted to slide on the conical surface 15, and are pressed downwardly by a compression spring 17. The lower end of the spring 17 bears on the slips 16. The upper end of the spring 17 surrounds the anvil 20, and abuts against the lower end of the part 3 of the head 1.

In practical operation, the fishing device, shown in Figure 1, is lowered into the well, and when the space where the lost tool is, is entered, the fishing device hugs one side of the well, and the upper end of the lost tool is directed by the flared mouth 18 within the slips 16, the spring 17 causing the slips 16 to grip the tool.

If the tool happens to stick as it is being pulled out, and it is necessary to churn the fishing device up and down, the upper end of the lost tool is engaged by the anvil 20.

Because there are no openings in the side of the body 1, there is no chance that the upper end of the lost tool will be deflected outwardly through the side of the body, to engage with the well, and perhaps, to put the well out of commission entirely.

Having thus described the invention, what is claimed is:—

1. A tool of the class described, comprising a head provided at its upper end with a connector which is laterally off-set with respect to the axis of the head, an imperforate cylindrical body mounted on the lower end of the head, the lower end of the body being cut off at an incline from one side of the body toward the other side of the body, an anvil carried by the lower end of the head and located within the upper end of the body, slips in the body, and a compression spring engaging the slips, the compression spring abutting against the lower end of the head and being disposed above the anvil.

2. A tool of the class described, comprising a head provided at its upper end with a connector which is laterally off-set with respect to the axis of the head, an imperforate cylindrical body mounted on the head, the lower end of the body being cut off at an incline from one side of the body toward the other side of the body to leave a circumferential edge of appreciable length, said edge being inwardly and upwardly bevelled, an anvil carried by the lower end of the head and located within the body, slips mounted in the body, and a compression spring engaging the slips, the compression spring being extended around the anvil and being in abutment at its upper end with the lower end of the head.

In testimony that I claim the foregoing as my own, I have hereto affixed my signature.

RALPH IRWIN HENDERSON.